(12) United States Patent
Sobina

(10) Patent No.: US 6,234,502 B1
(45) Date of Patent: *May 22, 2001

(54) TRAILING ARM LEAF SPRING WHEEL SUSPENSION

(75) Inventor: Roman Sobina, Melbourne (AU)

(73) Assignee: Workman Industries Pty Ltd. (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/860,414

(22) PCT Filed: Dec. 22, 1995

(86) PCT No.: PCT/AU95/00874

§ 371 Date: Aug. 26, 1997

§ 102(e) Date: Aug. 26, 1997

(87) PCT Pub. No.: WO96/20096

PCT Pub. Date: Jul. 4, 1996

(30) Foreign Application Priority Data

Dec. 23, 1994 (AU) .................................. PN 0326

(51) Int. Cl.$^7$ .................................. B60G 11/46
(52) U.S. Cl. .................. 280/124.163; 280/124.128; 280/124.153; 280/124.162
(58) Field of Search .................. 280/124.1, 124.11, 280/124.125, 124.128, 124.153, 124.162, 124.163, 124.164, 124.17

(56) References Cited

U.S. PATENT DOCUMENTS 4,168,844 * 9/1979 Smith .................................. 280/124.17
5,362,095 * 11/1994 Everley .
5,630,693 * 5/1997 Sobina .................................. 414/495
5,820,149 * 10/1998 Sobina .

FOREIGN PATENT DOCUMENTS 9526280 10/1995 (WO) .................................. B60P/1/02

* cited by examiner

Primary Examiner—Eric Culbreth
(74) Attorney, Agent, or Firm—Norris, McLaughlin & Marcus P.A.

(57) ABSTRACT

An improved self-powered or non-powered vehicle having a bed which is moveable between a transport position and a ground engaging loading position and in particular to a wheel assembly for such a vehicle. In one broad form the wheel assembly is connected to a u-shaped chassis, having two arms extending to the rear of the vehicle forming an opening therebetween. A trailing arm is pivotally suspended from a first end to one arm of the u-shaped chassis such that its other end extends towards the rear of the chassis. A wheel stub axle mounting is located at or adjacent to the other end of the trailing arm. A connection member is pivotally connected at one end to the trailing arm adjacent to the wheel stub axle mounting. A first bracket is pivotally connected to the other end of the connection member. A leaf spring is connected at or adjacent its middle to the first bracket. A second bracket has one end pivotally connected to the chassis rearwardly of the first bracket and its other end pivotally connected to one end of the leaf spring with the other end of the leaf spring being connected to the chassis on the other side of the first bracket. A shock absorber is connected between the first bracket and the chassis adjacent to the second bracket.

10 Claims, 4 Drawing Sheets

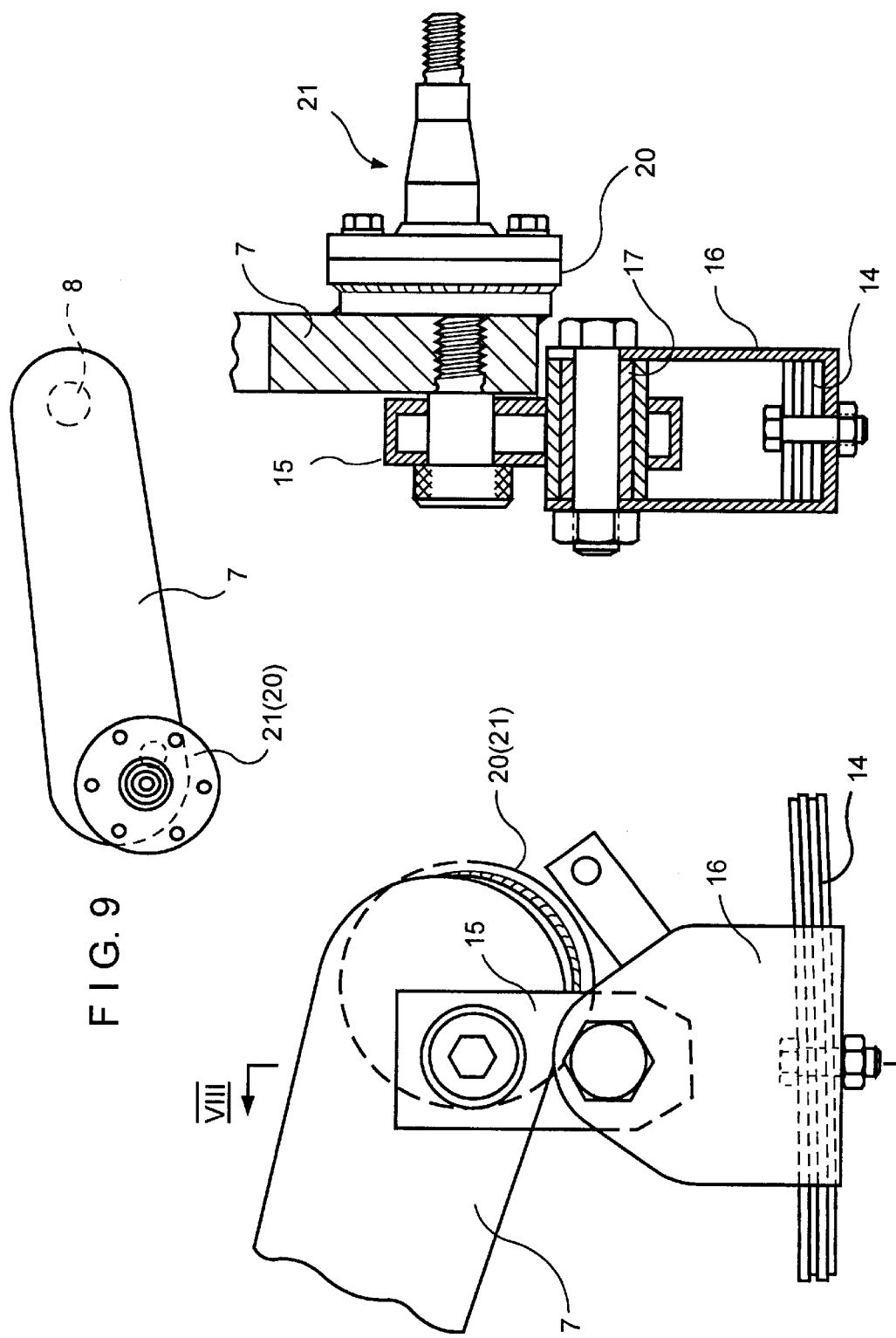

TRAILING ARM LEAF SPRING WHEEL SUSPENSION

The present invention relates to an improved self powered or non powered vehicle having a bed which is moveable between a transport position and a ground engaging loading position and in particular to a wheel assembly for such a vehicle.

In one broad form the invention comprises a wheel assembly adapted for connection to a yoke or unshaped chassis comprising:

a trailing arm pivotally suspended from a first end to one arm of the chassis;

a wheel stub axle mounting located at or adjacent the free end of the trailing arm;

a connection means located on said trailing arm adjacent said wheel stub axle mounting;

a first bracket pivotally connected to said connection means of said trailing arm;

a leaf spring connected at or adjacent its middle to said bracket;

a second bracket having one end pivotally connected to the chassis on one side of said first bracket and having its other end pivotally connected to one end of leaf spring, with the other end of said leaf spring being connected to the chassis on the other side of said first bracket; and a shock absorber being connected between the first bracket and the chassis adjacent the said second bracket.

The invention will now be described with reference to the accompanying drawings in which:

FIG. 7 shows a detail view of the connection of the leaf spring to the trailing arm as shown in FIG. 5;

FIG. 8 shows a sectional view of the connection of the leaf spring to the trailing arm taken along line VIII—VIII of FIG. 7; and FIG. 9 shows an elevation of the trailing arm.

The present invention is a modification of the invention described in PCT International patent application no. PCT/AU95/00162 (which corresponds to U.S. Pat. No. 5,630,693), which is incorporated herein by way of reference.

Figure 1:
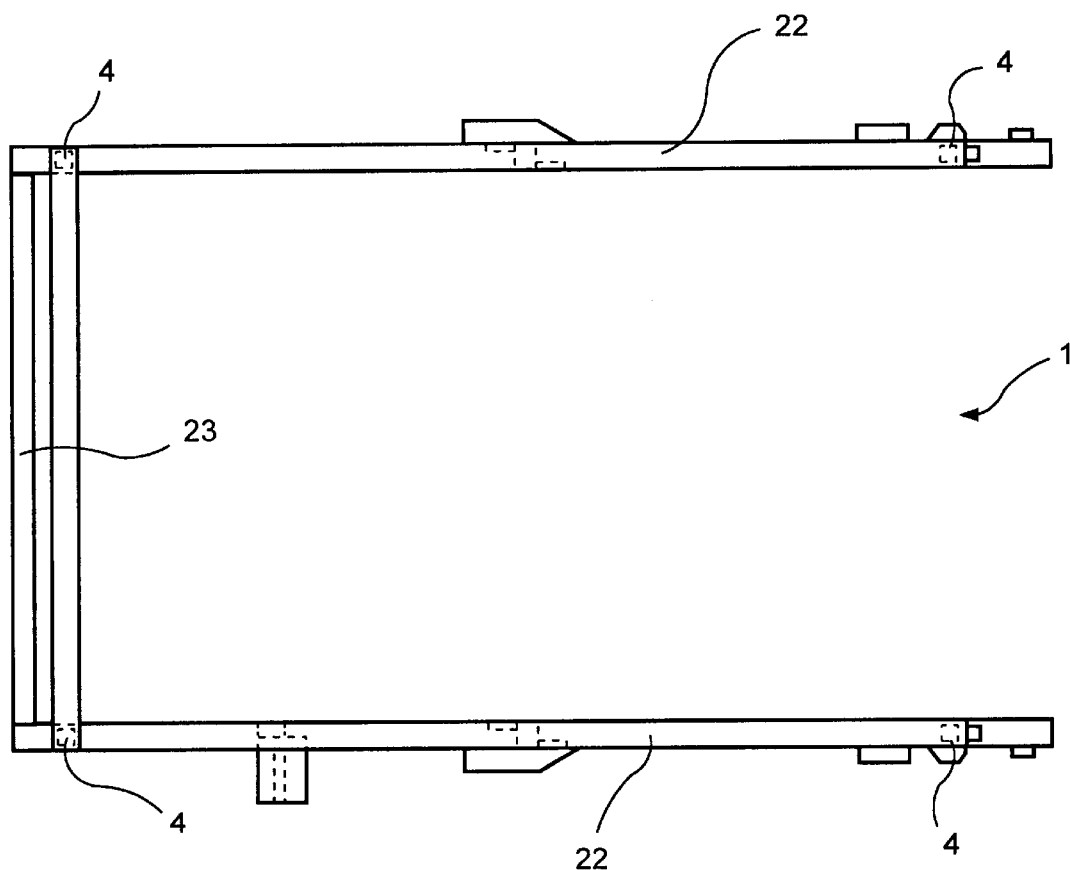
FIG. 1 shows a plan view of the rear chassis according to one embodiment of the present invention.
Figure 2:
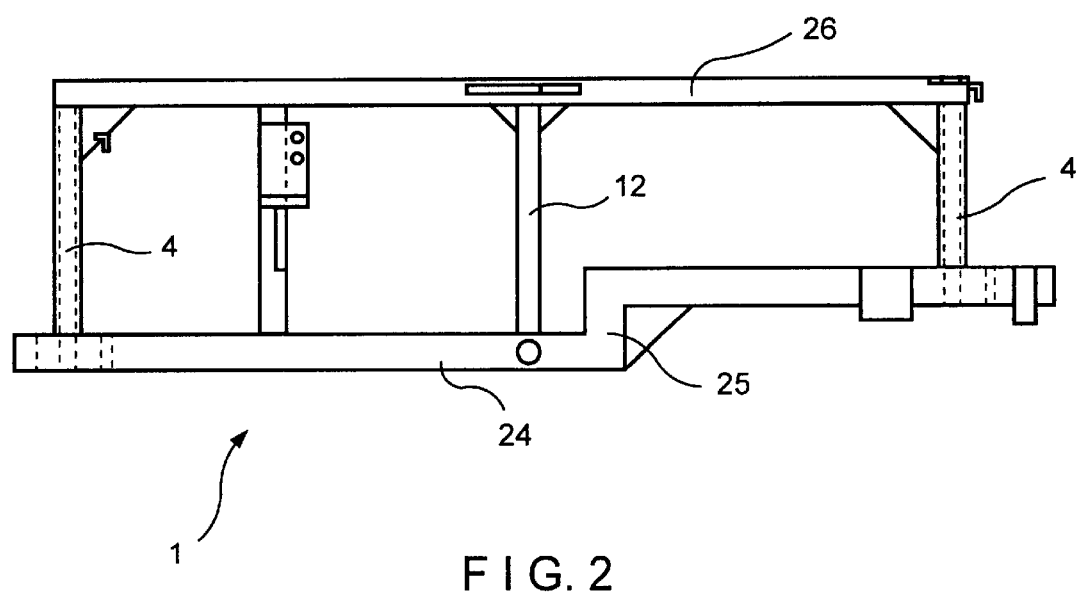
FIG. 2 shows a side elevation of the chassis shown in FIG. 1.

The present invention utilizes a yoke or unshaped rear chassis (1), as shown in FIGS. 1 and 2, the front of which is attached to the rear of the vehicle cabin (not shown). The chassis (1) comprises two arms (22), extending from end rail (23). Each arm (22) comprises a lower member (24), which has a step (25) intermediate its ends. The lower member (24) is connected to a top rail (26) by stays (12,4). The end stays (4) are hollow.

Figure 3:
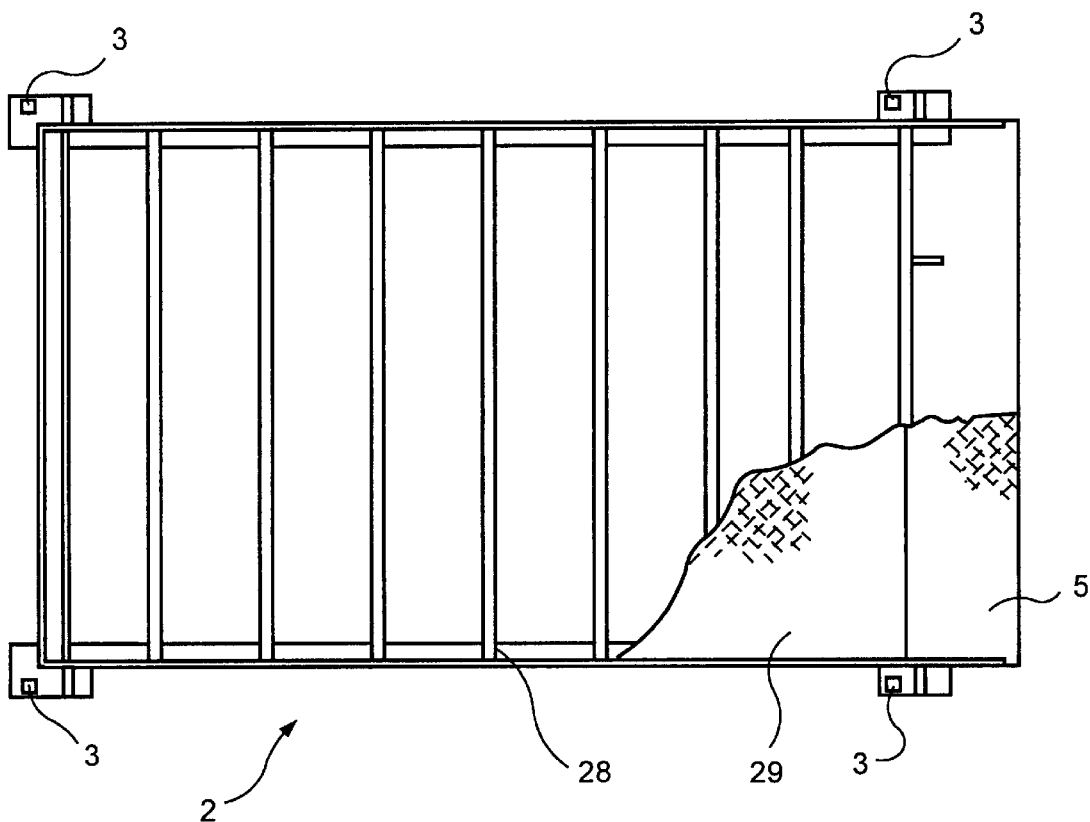
FIG. 3 shows plan view of a tray according to one embodiment of the present invention.
Figure 4:
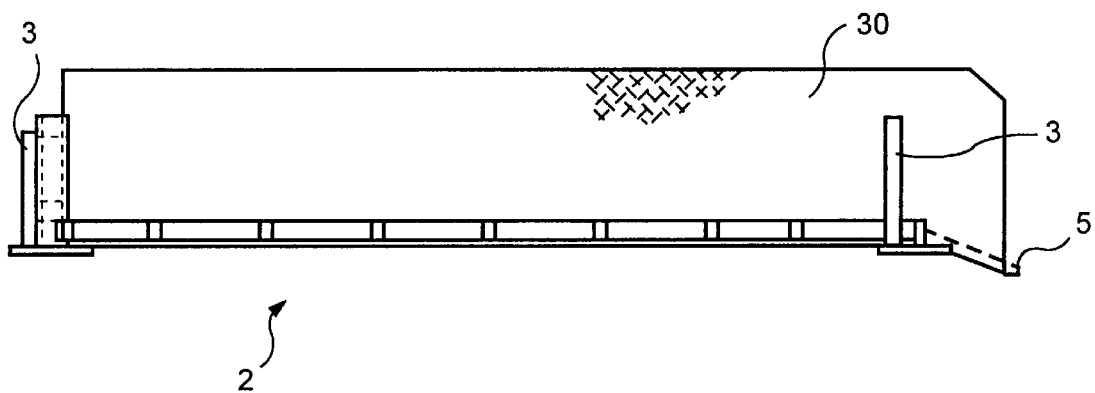
FIG. 4 shows a side elevation of the tray shown in FIG. 3.

A tray (2), as shown in FIGS. 3 and 4, comprises a rigid reinforced bed (28) with a suitable floor covering (29), and side walls (30). Located at each corner of tray (2) are guide rods (3). The tray (2) is located between the arms (22) of the chassis (1) and is supported thereby in like manner as described in the PCT/AU95/.00162 (which corresponds to U.S. Pat. No. 5,630,693), with the guide rods (3) of the tray (2) telescopically engage in the end stays (4) of the arms (22) of the chassis (1). Any suitable tray raising and lowering means such as hydraulics, cables or worm drives can be used.

The chassis can be incorporated into a pickup truck design or an enclosed van. Further, as shown in FIGS. 3 & 4, the tray (2) has pivotally connected thereto, a short ramp (5), with no tailgate. The rear door is on the body of the chassis.

The telescoping connection between the guide rods (3) and the end stays (4) enhances the rigidity of the chassis (1). This is also applicable if the guide rods were on the chassis and the stays were on the tray. Further the end stays (4) could incorporate a worm drive motor with the guide rods (3) suitably threaded to be driven by the worm drive motor to move the tray (2) between the ground engaging loading position and the raised transportation position. Similarly the drive means could be a rack located on either the tray or the chassis with a toothed wheel located on the other, whereby rotation of the geared wheel along the rack raises and lowers the tray.

Figures 5, 6:
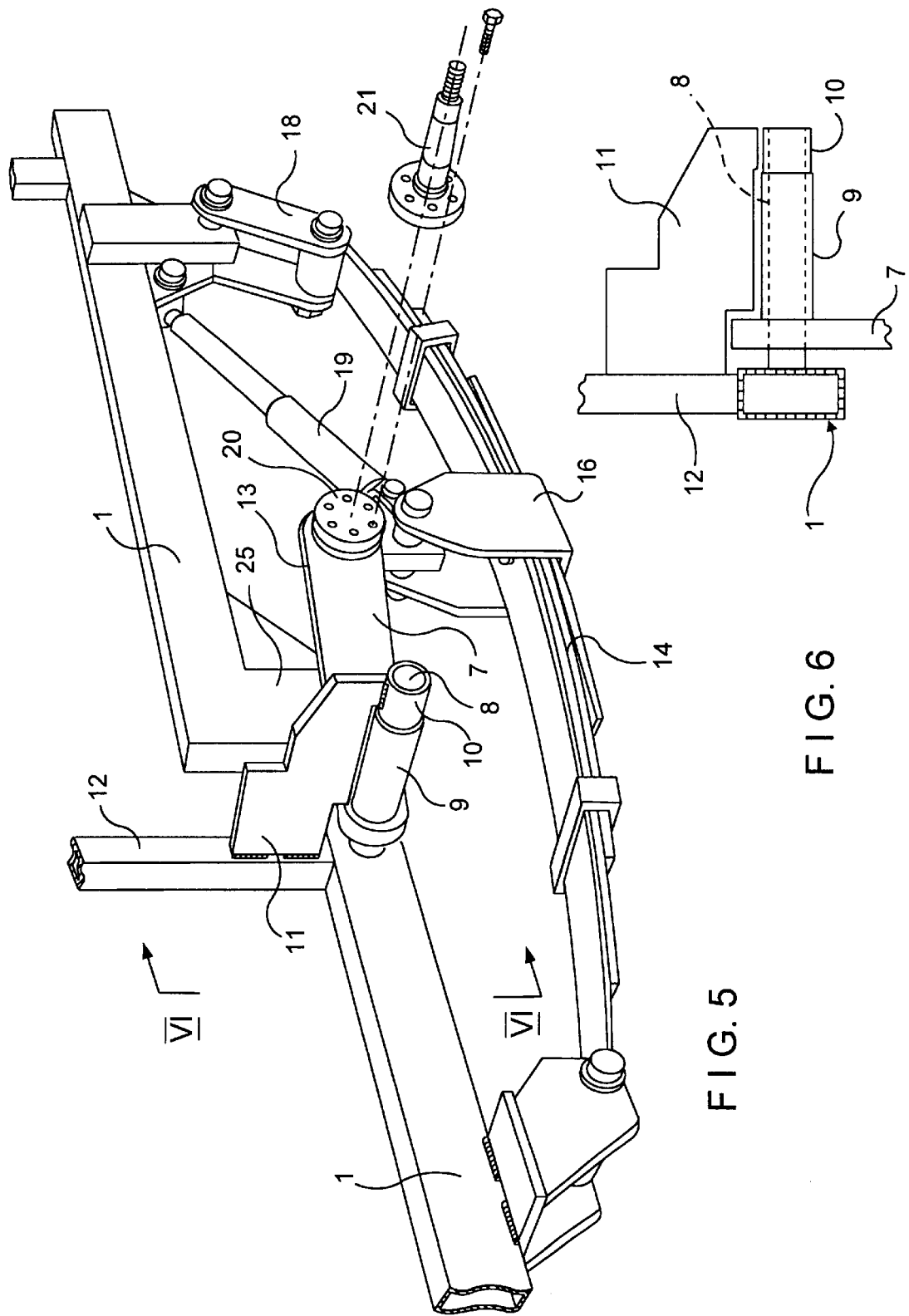
FIG. 5 shows a schematic view of a wheel assembly according to one embodiment of the present invention.
FIG. 6 shows a section view of the connection of the trailing arm connection to the chassis taken along line VI—VI of FIG. 5.

A wheel assembly (6) is shown in FIG. 5 according to one embodiment of the present invention. A trailing arm (7) is pivotally connected to the chassis (1), as shown in FIG. 6 on a shaft (8) whose outer end passes through a sheath (9) into the annular section (10) of the support plate (11). The support plate (11 ) is attached to the chassis brace (12) to transfer the loading of the trailing arm (7) back to the chassis(1). Mounted on the free end (13) of the trailing arm (7) is stub axle mounting (20), to which is bolted the stub axle (21). The free end (13) of the trailing arm (7) is pivotally connected to the centre of the leaf spring (14) through the member (15) and the spring holder (16), which in this case is supported on a bush (17) on the member (15).

One end of the leaf spring (14) is connected to the chassis (1), while the other end is pivotally connected to the member (18), which is pivotally connected to the chassis (1 ). A shock absorber (19) extends from the leaf spring holder (16) to the chassis (1) adjacent the member (18). This particular configuration provides a robust suspension system.

As is shown in FIG. 5, the stub axle mounting is positioned behind the step (25) so as to provide adequate room for movement of the components during use. As shown in FIG. 9, the trailing arm (7) is tapered from the stub axle mount end to the other end.

It should be obvious that alterations and modifications could be made to the above described embodiment without departing from the scope and spirit of the present invention.

What is claimed is:

1. A wheel assembly adapted for connection to a yoke or u-shaped chassis, having two arms extending to the rear of the vehicle forming an opening therebetween comprising:

a trailing arm pivotally suspended from a first end to one arm of the u-shaped chassis such that its other end extends towards the rear of the chassis;

a wheel stub axle mounting located at or adjacent the other end of the trailing arm;

a connection member having two ends, pivotally connected at a first end to said trailing arm adjacent said wheel stub axle mounting;

a first bracket pivotally connected to the other end of said connection member;

a leaf spring connected at or adjacent its middle to said first bracket;

a second bracket having one end pivotally connected to the chassis rearwardly of said first bracket and having its other end pivotally connected to one end of said leaf spring with the other end of said leaf spring being connected to the chassis on the other side of said first bracket; and a shock absorber being connected between the first bracket and the chassis adjacent the said second bracket.

2. A wheel assembly according to claim 1, wherein said trailing arm is pivotally connected to said chassis by a shaft which is engaged by an annular section of a support plate which is fixedly attached to a chassis brace extending upwardly from one of said chassis arms.

3. A vehicle comprising:

a yoke or u-shaped chassis having side walls extending upwardly from two substantially parallel arms having an opening therebetween;

a tray located between said arms and having posts parallel to each other extending from the tray;

parallel elongated members located in said side walls and telescopingly engaging with said parallel posts of said tray so as to enhance the rigidity of the chassis and to maintain the tray in substantially the same orientation during the movement of the tray from a raised transport position to a ground engaging loading position; and a wheel assembly located on each arm of the chassis, comprising:

a trailing arm pivotally suspended from a first end to one arm of the yoke or u-shaped chassis such that its other end extends towards the rear of the chassis;

a wheel stub axle mounting located at or adjacent the other end of the trailing arm;

a connection member having two ends, pivotally connected at a first end to said trailing arm adjacent said wheel stub axle mounting;

a first bracket pivotally connected to the other end of said connection member;

a leaf spring connected at or adjacent its middle to said first bracket;

a second bracket having one end pivotally connected to the arm of the chassis rearwardly of said first bracket and having its other end pivotally connected to one end of said leaf spring, with the other end of said leaf spring being connected to the chassis on the other side of said first bracket; and a shock absorber being connected between the first bracket and the chassis adjacent the second bracket.

4. A vehicle according to claim 3 wherein each arm of the chassis is stepped to form a lower front portion and a higher back portion, with the first end of the trailing arm being pivotally connected to the lower front portion of the arm of the chassis, and the second bracket is connected to the higher back portion of the arm of the chassis.

5. A vehicle according to claim 4, wherein the chassis comprises two opposed side walls and an end wall, each of which includes a top and bottom rail, joined by reinforcing struts.

6. A wheel assembly according to claim 4, wherein said trailing arm is pivotally connected to said chassis by a shaft which is engaged by an annular section of a support plate which is fixedly attached to a chassis brace extending upwardly from one of said chassis arms within said side wall.

7. A vehicle comprising:

a unshaped chassis having side walls extending upwardly from two substantially parallel arms having an opening therebetween;

a tray located between said arms and having posts parallel to each other extending from the tray;

parallel elongated members located in said side walls and telescopingly engaging with said parallel posts of said tray so as to enhance the rigidity of the chassis and to maintain the tray in substantially the same orientation during the movement of the tray from a raised transport position to a ground engaging loading position;

hydraulic cylinders to move said tray between said transport position and said loading position; and a wheel assembly located on each arm of the chassis, comprising:

a trailing arm pivotally suspended from a first end to one arm of the u-shaped chassis such that its other end extends towards the rear of the chassis;

a wheel stub axle mounting located at or adjacent the other end of the trailing arm;

a connection member having two ends pivotally connected at a first end to said trailing arm adjacent said wheel stub axle mounting;

a first bracket pivotally connected to the other end of said connection member;

a leaf spring connected at or adjacent its middle to said first bracket;

a second bracket having one end pivotally connected to the chassis rearwardly of said first bracket and having its other end pivotally connected to one end of said leaf spring, with the other end of said leaf spring being connected to the chassis on the other side of said first bracket; and a shock absorber being connected between the first bracket and the chassis adjacent the said second bracket.

8. A vehicle according to claim 7 wherein each arm of the chassis is stepped to form a lower front portion and a higher back portion, with the first end of the trailing arm being pivotally connected to the lower front portion of the arm of the chassis, and the second bracket is connected to the higher back portion of the arm of the chassis.

9. A vehicle according to claim 7, wherein said trailing arm of said wheel assembly is pivotally connected to said chassis by a shaft which is engaged by an annular section of a support plate which is fixedly attached to a chassis brace extending upwardly from one of said chassis arms within the side wall.

10. A vehicle according to claim 7, wherein the chassis comprises two opposed side walls and an end wall, each of which include a top and bottom rail, joined by reinforcing struts.

* * * * *